Oct. 21, 1930.  S. O'HANRAHAN  1,779,141
POWER TRANSMISSION MEANS COMBINED WITH MOTOR
VEHICLES AND ENGINES OF SAME
Filed May 3, 1929

INVENTOR:
Sean O'Hanrahan.
By
Wm. Ewart Doyle,
Patent Attorney.

Patented Oct. 21, 1930

1,779,141

UNITED STATES PATENT OFFICE

SEAN O'HANRAHAN, OF INISFAIL, BALLYSHANNON, IRISH FREE STATE

POWER-TRANSMISSION MEANS COMBINED WITH MOTOR VEHICLES AND ENGINES OF SAME

Application filed May 3, 1929. Serial No. 360,238.

This invention relates to power transmission means combined with motor vehicles and engines of same, the object being to provide suitable means for driving other machinery remote from the motor vehicle and engine of same, such as agricultural machinery.

The present invention has no reference whatever to driving machinery which is part of the motor vehicle such as the dynamo or engine starter or magneto.

Hitherto for the purpose of driving agricultural or other stationary machinery it was necessary to install an expensive power plant such as an engine which was frequently inactive for long periods.

By means of power transmission means, according to my present invention, the motor vehicle and its engine which are normally used for travelling purposes can also be used as a power plant for driving agricultural or other land machinery and so saving the great cost of installing a separate power plant for the foregoing purpose.

According to my present invention, the power transmission means combined with motor vehicles and engines of same, comprises the combination with the front of the motor vehicle and engine of same of power transmission means adapted to be suitably secured to the motor vehicle and being suitably connected to the engine crank shaft extension from the usual crank case of the engine, said power transmission means being provided with suitable means for driving other machinery remote from the motor vehicle and engine of same, such as farm machinery which is used for a variety of purposes on the farm.

Figure 1:
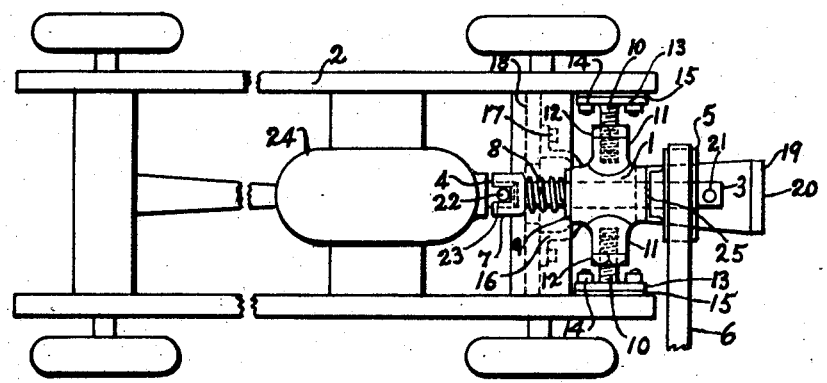
Figure 2:
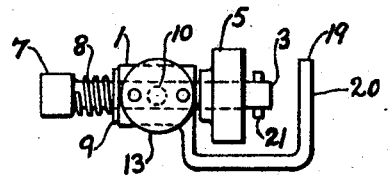

By way of example in accordance with my present invention, Fig. 1 shows a plan view of power transmission means combined with the front of the motor vehicle and the engine of same, and Fig. 2 shows a side elevation of the power transmission means removed from the motor vehicle, in the accompanying explanatory diagrammatic drawing.

In the example shown, the bracket bearing 1 is connected to the motor vehicle indicated by 2, and has therein a driven shaft 3 which is coupled to the engine crank shaft extension 4, and has on the other or exterior front end of the driven shaft 3 means for driving other machinery, such as a pulley 5 keyed to the shaft 3 and provided with a belt 6 for direct connection to a machine to be driven, or for connection to another pulley on a line shaft which might be provided with other pulleys connected by belts to several machines. The bracket bearing 1 is adapted to be adjustably connected to the motor vehicle 2, the driven shaft 3 being slidable and rotatable in the bracket bearing 1, and has its coupling end 7 spring-pressed into engagement with the engine crank shaft extension 4 by means of a spring 8 between the coupling 7 and a washer 9 through which the shaft 3 slidably passes, the coupling end 7 being capable of being moved against the action of its spring 8 out of engagement with the crank shaft extension 4 when it is not desired to drive the shaft 3. The bracket bearing 1 is provided on its opposite sides with an adjustable screw stud 10 which screws into the boss 11 and is provided with a lock-nut 12, each screw stud 10 having a flange 13 adapted to be bolted by means of bolts 14 to each side of the chassis and may therefore be used for various widths of chassis by loosening the lock-nuts 12 and adjusting the screw studs 10 to the proper width. Where found convenient, a distance piece 15 might be inserted between each flange 13 and the chassis.

Where it is not convenient to bolt the bracket bearing 1 to the sides of the chassis as shown in full outline in Fig. 1, the bosses 11 and the screw studs 10 and their parts are dispensed with, and instead, the bracket bearing 1 is provided with a flanged extension 16 shown in dotted outline, and which at 17 is adapted to be bolted to the usual cross member 18 of the chassis, or is provided with rigid side extensions such as the flanges 13 cast integral with the bracket bearing 1 and adapted to be bolted as shown to the sides of the chassis, to suit any suitable width of chassis.

To accommodate any suitable type of known starting handle used on the motor vehicle, the bracket bearing 1 is provided with a forwardly projecting extension 19 which is bored at 20 to receive an engine starting handle in alignment with the driven shaft 3 which is provided with means for its connection to the starting handle, such as the known kind of cross pin 21 a duplicate of which is shown at 22 in the extension 4 of the engine crank shaft. Each side of the coupling end 7 is slotted at 23 in the known manner for engagement with the cross pin 22. The coupling end 7 as also the other end of the driven shaft 3 may be formed or constructed in any suitable and known manner to suit connection to the known type of starting handle adopted for the end 3 and to suit the crank shaft extension 4. The engine is indicated by 24.

To disengage the coupling 7 from the extension 4, the pulley 5 is pulled outwards and a suitable wooden wedge is then inserted in the widened gap at 25, or when not required the whole power transmission apparatus may be removed from the motor vehicle.

Having described my invention, I claim:—

Power transmission means combined with motor vehicles and engines of same, comprising in combination with the front of the motor vehicle and engine of same a power transmission means in the form of a bracket bearing, in said bracket bearing a driven shaft coupled at one end to the engine crank shaft extension, on the other end of the driven shaft means for driving other machinery remote from the motor vehicle and engine of same, on the opposite sides of the bracket bearing an adjustable screw stud and lock nut, on each screw stud a flange adapted to be bolted to each side of the chassis.

Signed by me this 22nd day of April, 1929.

SEAN O'HANRAHAN.